Figure 1:
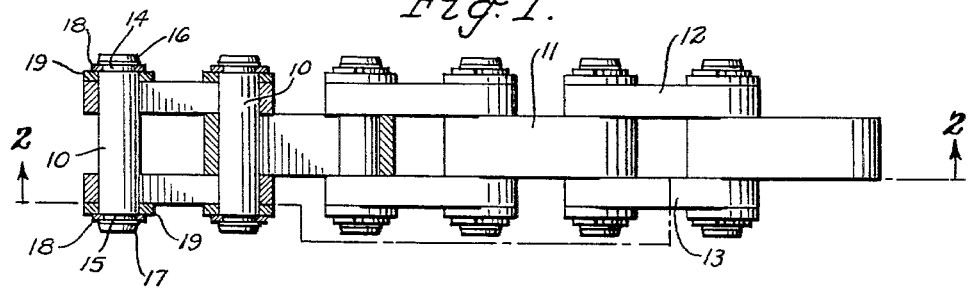

May 10, 1966  F. L. HOOPER  3,250,381

METHOD OF CLEANING A WIRE BELT

Original Filed Aug. 9, 1962  2 Sheets-Sheet 1

INVENTOR.
FRED L. HOOPER

BY
Victor J. Evans & Co.
ATTORNEYS

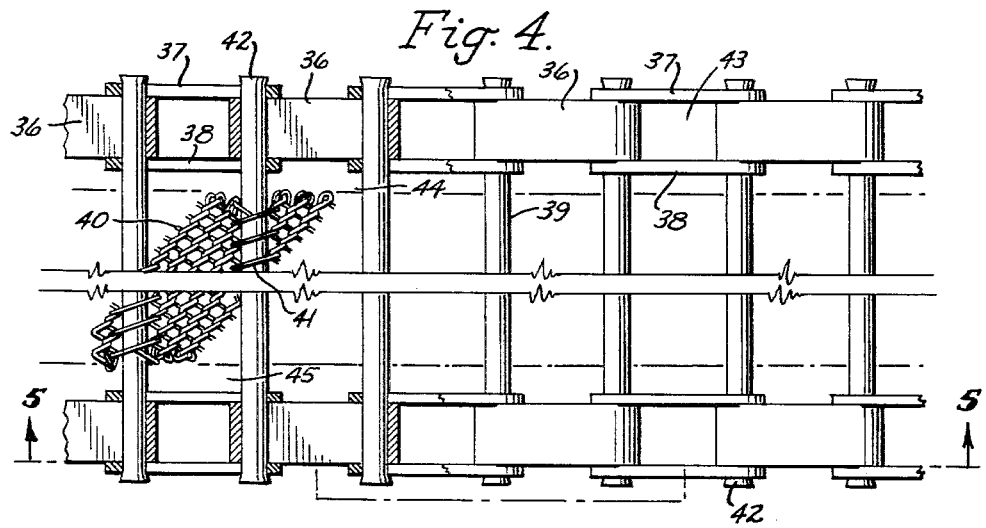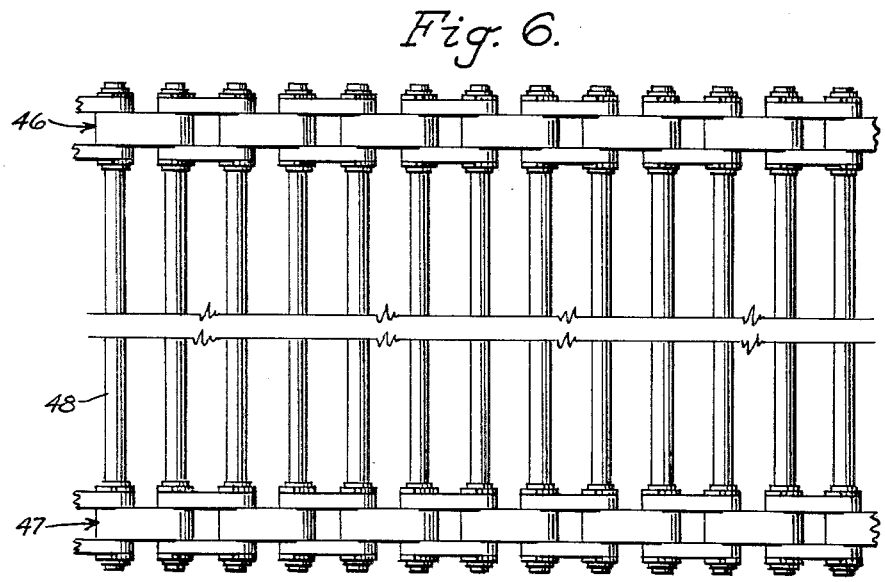

United States Patent Office 3,250,381
Patented May 10, 1966

3,250,381
METHOD OF CLEANING A WIRE BELT
Fred L. Hooper, Cambridge, Md., assignor to Cambridge Wire Cloth Company, Cambridge, Md., a corporation of Maryland
Continuation of application Ser. No. 216,950, Aug. 9, 1962. This application Feb. 18, 1965, Ser. No. 438,175
3 Claims. (Cl. 198—229)

The present invention is a continuation of my application, Serial No. 216,950, filed August 9, 1962, now abandoned.

This invention relates to the construction of woven wire chains such as used in conveyor belts and transmission machinery whereby the chain may be collapsed or moved into a configuration where clearance is provided between and around all parts which permits removal of all foreign matter or as hereinafter explained, permits the chain to be completely sanitized with a detergent or other cleaning agent.

The purpose of this invention is to provide constructions for chains which enable the user to quickly and easily clean the chain of all foreign matter.

The specific present use is as a belt to convey products in the food industry where the possibility of bacteria growth being transferred from the belt to the product must be held to a minimum. In the past this possibility presented little difficulty due to the fact that the food product, at least once during the processing, was subjected to a temperature sufficiently high to kill all bacteria. However, with the advent of frozen foods the industry underwent an abrupt change. Any bacteria allowed to grow on the belt may be transferred to the food product being carried by the belt, as such bacteria will remain in a dormant state while frozen and will not be killed by the freezing process. Subsequently, when the consumer thaws the product, the bacteria initially present will initiate an action whereby the quantity of bacteria will double at a rate on the order of once each twenty minutes. This bacteria growth during the thawing process causes deterioration of the product. Consequently, the product must be prepared and frozen with an absolute minimum of bacteria present and, hence, the sprocket chains at the side of the belt must be of a design that is easily sanitized.

The primary object of the present invention is to provide a chain construction at the sides of a belt which may be easily and quickly collapsed so that all the parts are loose and which may be cleaned by steam or other means, removing all foreign matter from the parts of the chain.

Another object of the present invention is to provide, in a belt chain, components which are easily and with facility collapsed and which return to their normal position of use without entanglement.

A further object of the present invention is to provide a chain for a sanitary belt which is simple in construction, one which may be readily manufactured, and one which is economically feasible.

Figure 2:
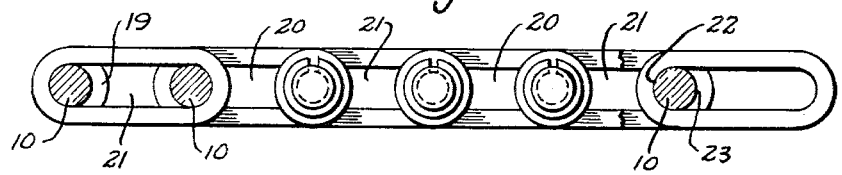
Figure 3:
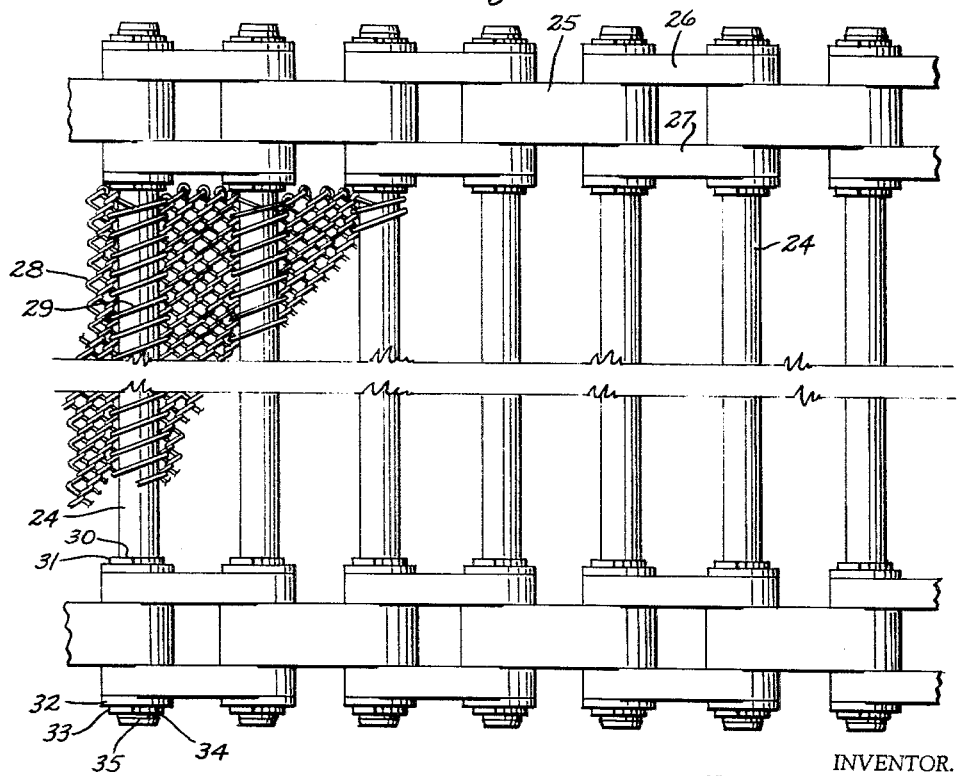

These and other objects and advantages of the present invention will be fully apparent from the following description when taken in connection with the annexed drawings, in which:

FIGURE 1 is a plan view of a chain constructed according to the present invention with parts broken away and parts shown in section, FIGURE 2 is a side elevational view of the assembly shown in FIGURE 1 with parts in section and with the sections taken on line 2—2 of FIGURE 1, FIGURE 3 is a plan view of a belt constructed according to the present invention using the assembly shown in FIGURE 1, FIGURE 4 is a plan view of a belt with a mid-portion broken away, showing a modified form of the chain construction, FIGURE 5 is a view taken on the line 5—5 of FIGURE 4, and FIGURE 6 is a plan view of a still further modified form of the invention.

Referring now to the drawings in which like numerals indicate like parts throughout the several views, in FIGURES 1 and 2, a chain for a belt is shown in which pins 10 extend through open center links 11 and open side links 12 and 13 with the ends of the pins 10 provided with annular grooves 14 and 15. The grooves 14 and 15 define heads 16 and 17 with split elements or washers 18 positioned in the grooves 14 and 15 and bearing members or washers 19 mounted on the ends of the pins and positioned between the outer surfaces of the side links 12 and 13 and the split washers 18.

The open center links 11 are in the form of endless bands having elongated openings 20 through which the pins 10 extend and the side links 12 and 13 are provided with similar openings 21, which are also positioned to receive the pins 10.

With the pins 10 extended through the elongated openings in the links 11, the chain is readily collapsed when tension is relieved on the chain. With the chains collapsed open spaces are provided between the inner surfaces 22 at the ends of the center links 11 and the pins 10 and between the inner surfaces 23 of the side links 12 and 13 and the pins 10.

Upon collapsing of the chain detergents or other cleansing agents may contact substantially all the surfaces of the component parts of the chain.

In FIGURE 3 a modified form of the invention is shown in which pins 24, similar to the pins 10, extend through openings in center links 25 and side links 26 and 27. The pins 24 extend through a wire fabric 28 of the belt which is secured to the pins 24 by loops 29. Annular grooves 30 are provided in the pins 24 and split washers 31 are disposed in the grooves 30. The outer ends of the pins 24 are provided with washers 32, split washers 33 and annular grooves 34 and with heads 35 similar to the corresponding parts of the chain shown in FIGURES 1 and 2.

In FIGURES 4 and 5 there is shown a further modification in which open center links 36 in combination with open side links 37 and 38 are connected by rods 39 and a wire fabric 40 is secured on the rods 39 by loops 41. In this form of the invention the rods 39 are upset to provide heads 42.

In this form of the invention the openings 43 between the links 37 and 38 may be employed to receive a piece of a sprocket wheel or the spaces 44 and 45 between the edges of the fabric mesh and the adjacent links 38 may be employed to receive the teeth of such a sprocket wheel.

In FIGURE 6 a further modification of the invention is shown in which open link chains 46 and 47 are connected by rods 48 and there is no wire fabric in this form of the invention.

In use, any one of the forms of the invention may be readily collapsed for cleaning, the pins or rods which traverse the links being readily shiftable along the length of the link when tension is removed from the chain. This permits thorough cleaning of each of the inside surfaces of the links and the normally covered portions of the pins or rods.

While only preferred embodiments of the invention are shown and described, other embodiments are contemplated and numerous changes and modifications may be made therein without departing from the spirit of the invention as set forth in the appended claims.

What is claimed is:
1. A method for cleaning a woven wire conveyor belt having a collapsible woven wire fabric and collapsible link members extending along the longitudinal sides of the woven wire fabric and operatively connected thereto by transverse rods, comprising the steps of:
   removing axial tension from the woven wire conveyor belt;
   collapsing the wire fabric and link members so that the rods will move within the link members so as to be disposed inwardly of the ends of the link members whereby a cleaning fluid can pass between the rods and the ends of the link members; and
   directing a cleaning fluid through the conveyor belt so as to remove foreign matter from the link members and wire fabric.
2. The method as defined in claim 1 wherein the cleaning fluid comprises steam.
3. The method as defined in claim 1 wherein the cleaning fluid comprises a liquid.

References Cited by the Examiner
UNITED STATES PATENTS

| | | | |
|---|---|---|---|
| 802,511 | 10/1905 | Huillard | 198—193 XR |
| 1,144,323 | 6/1915 | Carpenter | 198—193 |
| 2,114,180 | 4/1938 | Guba | 198—194 |
| 2,271,436 | 1/1942 | Lathrop | 198—229 |
| 2,278,361 | 3/1942 | Rapisarda | 198—182 |
| 2,753,039 | 7/1956 | Velten et al. | 198—195 |

EVON C. BLUNK, *Primary Examiner.*

SAMUEL COLEMAN, *Examiner.*

R. J. HICKEY, *Assistant Examiner.*